(12) United States Patent
Jang

(10) Patent No.: US 7,761,792 B2
(45) Date of Patent: *Jul. 20, 2010

(54) METHOD OF AND APPARATUS FOR DISPLAYING MESSAGES ON A MOBILE TERMINAL

(75) Inventor: Jae Jun Jang, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/650,985

(22) Filed: Jan. 9, 2007

(65) Prior Publication Data

US 2007/0113176 A1    May 17, 2007

Related U.S. Application Data

(63) Continuation of application No. 10/992,105, filed on Nov. 19, 2004.

(30) Foreign Application Priority Data

Nov. 20, 2003  (KR) .......................... 2003-0082708

(51) Int. Cl.
G06F 17/00        (2006.01)
(52) U.S. Cl. ...................................... 715/273; 715/243
(58) Field of Classification Search .................. 715/513,
715/517, 526, 530, 234, 243, 255, 273, 748,
715/790, 791, 792, 793, 794, 795, 796, 803,
715/804
See application file for complete search history.

(56) References Cited

U.S. PATENT DOCUMENTS

| | | | | |
|---|---|---|---|---|
| 5,619,639 A | * | 4/1997 | Mast ........................... | 715/798 |
| 5,781,901 A | * | 7/1998 | Kuzma ......................... | 707/10 |
| 5,818,447 A | * | 10/1998 | Wolf et al. ................... | 715/752 |
| 7,000,198 B1 | | 2/2006 | Shrader et al. | |
| 7,027,463 B2 | * | 4/2006 | Mathew et al. .............. | 370/463 |
| 7,111,044 B2 | * | 9/2006 | Lee ............................. | 709/204 |
| 2001/0005864 A1 | * | 6/2001 | Mousseau et al. ........... | 709/318 |
| 2001/0054074 A1 | * | 12/2001 | Hayashi ....................... | 709/206 |
| 2002/0049852 A1 | * | 4/2002 | Lee et al. .................... | 709/231 |
| 2002/0130896 A1 | | 9/2002 | Spence | |
| 2002/0156869 A1 | * | 10/2002 | Wong et al. ................. | 709/219 |
| 2003/0009528 A1 | | 1/2003 | Sharif et al. | |
| 2003/0041112 A1 | * | 2/2003 | Tada et al. ................... | 709/206 |

(Continued)

FOREIGN PATENT DOCUMENTS

JP    2000285047    10/2000

(Continued)

OTHER PUBLICATIONS

Pizano, Arturo, et al., "Integrated Multimedia Messaging Concepts and Applications", 1996 ACM Database.*

(Continued)

*Primary Examiner*—Laurie Ries
(74) *Attorney, Agent, or Firm*—Ked & Associates LLP

(57) ABSTRACT

A method and apparatus simultaneously displays the main text and/or more attached filed of a message received in a mobile terminal. This simultaneous display allows a user to confirm the main text and attached files in the message. The main text and attached files may be shown in respective areas of the display.

31 Claims, 4 Drawing Sheets

U.S. PATENT DOCUMENTS

| | | | |
|---|---|---|---|
| 2003/0084111 A1 | 5/2003 | Yasuta | |
| 2003/0093565 A1* | 5/2003 | Berger et al. | 709/246 |
| 2003/0095550 A1* | 5/2003 | Lewis et al. | 370/392 |
| 2004/0019900 A1* | 1/2004 | Knightbridge et al. | 725/23 |
| 2004/0204145 A1* | 10/2004 | Nagatomo | 455/566 |
| 2004/0236834 A1* | 11/2004 | Kreitzer | 709/206 |
| 2005/0015721 A1* | 1/2005 | Tsai | 715/513 |
| 2005/0066365 A1* | 3/2005 | Rambo | 725/51 |
| 2005/0076087 A1* | 4/2005 | Budd et al. | 709/206 |
| 2005/0086310 A1* | 4/2005 | Kamdar et al. | 709/206 |
| 2006/0095510 A1* | 5/2006 | Rouse et al. | 709/203 |
| 2007/0191070 A1* | 8/2007 | Rao | 455/566 |
| 2007/0288863 A1 | 12/2007 | Ording et al. | |
| 2008/0005247 A9* | 1/2008 | Khoo | 709/206 |

FOREIGN PATENT DOCUMENTS

| | | |
|---|---|---|
| JP | 2001134433 | 5/2001 |
| JP | 2002091880 | 3/2002 |
| JP | 2002140271 | 5/2002 |
| KR | 000024577 | 5/2000 |
| KR | 000063801 | 11/2000 |
| KR | 1020020007532 | 1/2002 |
| KR | 1020020080185 | 10/2002 |
| KR | 1020030053274 | 6/2003 |
| KR (B) | 10-2003-0084745 | 11/2003 |
| WO | 0045321 | 8/2000 |
| WO | WO 03/094517 A1 | 11/2003 |

OTHER PUBLICATIONS

Office Action from related U.S. Appl. No. 10/992,105 dated May 21, 2010.

* cited by examiner

METHOD OF AND APPARATUS FOR DISPLAYING MESSAGES ON A MOBILE TERMINAL

This application is a Continuation of U.S. application Ser. No. 10/992,105 filed Nov. 19, 2004. The disclosures of the previous applications are incorporated by reference herein.

BACKGROUND OF THE INVENTION

1. Field of the Invention

The present invention relates to wireless communications, and more particularly to systems and methods for displaying messages on a mobile terminal.

2. Background of the Related Art

A message system is a communication scheme for transmitting and receiving various kinds of data such as letters, etc. between users through one or more communication networks. Users knowing message addresses, for example, can transmit and receive messages with other parties through a wired or wireless Internet. The messages may include main text and one or more attached files to be transmitted to the other party. The attached files may include text files, image files, moving picture files, sound files, etc. which are independent of the main text.

Messages including one or more attached files are described above can be confirmed with mobile terminals connected to communication networks. Mobile terminals such as portable mobile phones and personal digital assistants (PDAs), have been more widely used for confirming messages in recent times.

FIG. 1 shows how part of the main text of a message including an attached file may be displayed. In this figure, only file names of the attached files are displayed. As shown in FIG. 1, when the message is confirmed using a mobile phone having a display unit which is much smaller than display units of stand-type personal or notebook-type personal computers, only the file names of the attached files are displayed. Their names can be selected one-by-one to confirm details thereof. This method of display and confirmation is troublesome because it requires multiple key manipulations.

Also, when an attached file directly related to details of the main text is displayed, it is impossible to simultaneously confirm the main text and the attached file, so there is a disadvantage in that all the details of the message and file cannot be understood.

Japanese Patent Application Laid-open No. 2000-285047 discloses a technique of automatically reproducing an attached file included in a message, but this technique has a problem in that since the main text cannot be simultaneously confirmed even if the attached file is reproduced, the main text and the attached file cannot be simultaneously confirmed.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a method of and an apparatus for displaying a message on mobile terminal, which when a message sent to an account (message address) of a user is intended to be confirmed, allows a user to more conveniently confirm the message by simultaneously displaying main text of the message and an attached file included with the message preferably in respective specified areas of a display unit.

In order to accomplish the foregoing objects, according to an aspect of the present invention, there is provided a method of displaying a message on mobile phone, comprising a main text of the message; at least one attached file of the message; a displaying unit simultaneously both the main text and the attached file.

The method further comprising a converting process of message into a synchronized multimedia integration language (SMIL) file that is set to execute the attached file and display it at the display unit simultaneously with the main text; and a displaying process of message in such way by driving the SMIL file in response to press of the key indicating the confirmation of the message.

In the converting process the SMIL file is set to allot display area for the attached file and main text to display the attached file and the main text simultaneously using display-specifying data stored in a memory.

The method further comprises a setting process of user by inputting the display-specifying data to be stored in a memory. The display-specifying data may contain inputting data indicating whether a sound file would be executed or not, and/or inputting data indicating when the sound file to be executed. In the converting process if a number of attached file exceeds that of displaying area to display the attached file allotted by display-specifying data, the attached file is set to be displayed sequentially and rotationally.

The attached file may be set to be displayed sequentially and rotationally in response to press of a predetermined key. Alternatively, the attached file may be set to be displayed sequentially and rotationally with a predetermined cycle. The predetermined cycle with which the attached file is set to be displayed sequentially and rotationally is set using the display-specifying data.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION OF PREFERRED EMBODIMENTS

Figure 1:
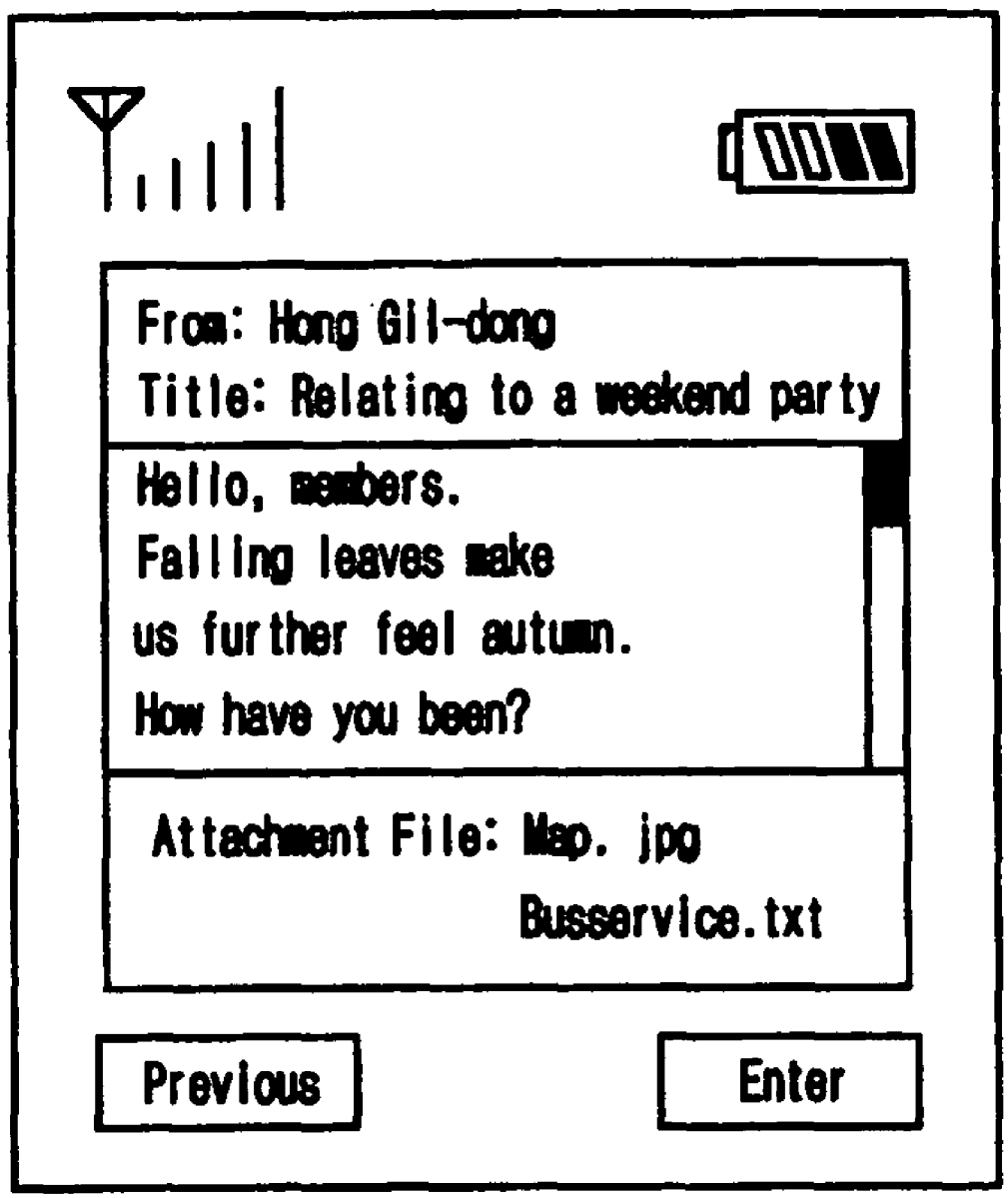
FIG. 1 is a diagram illustrating a screen of a related art mobile phone during message confirmation.
Figure 2:
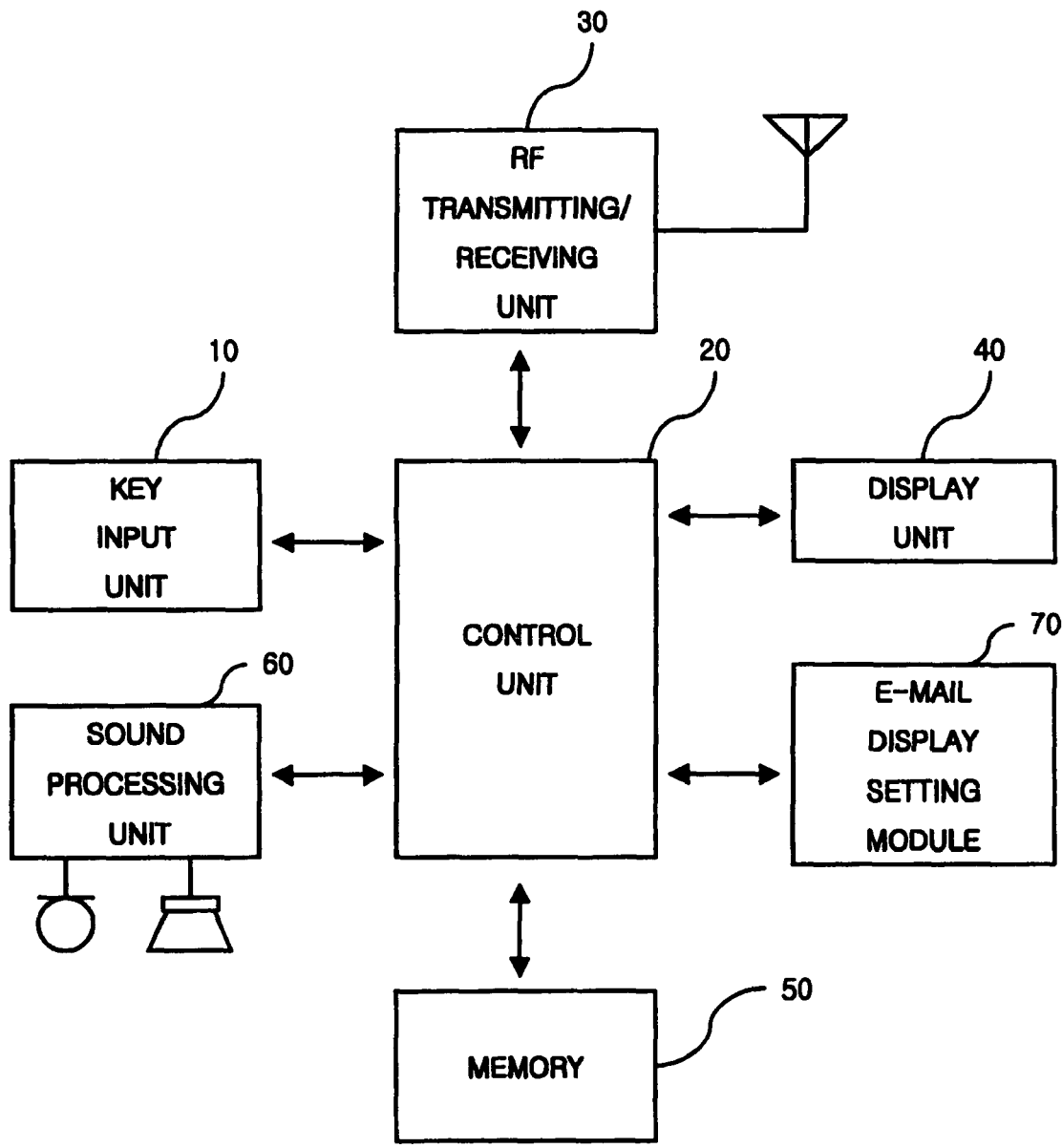
FIG. 2 is a block diagram illustrating an embodiment of a structure of a mobile terminal of the present invention.
Figure 3:
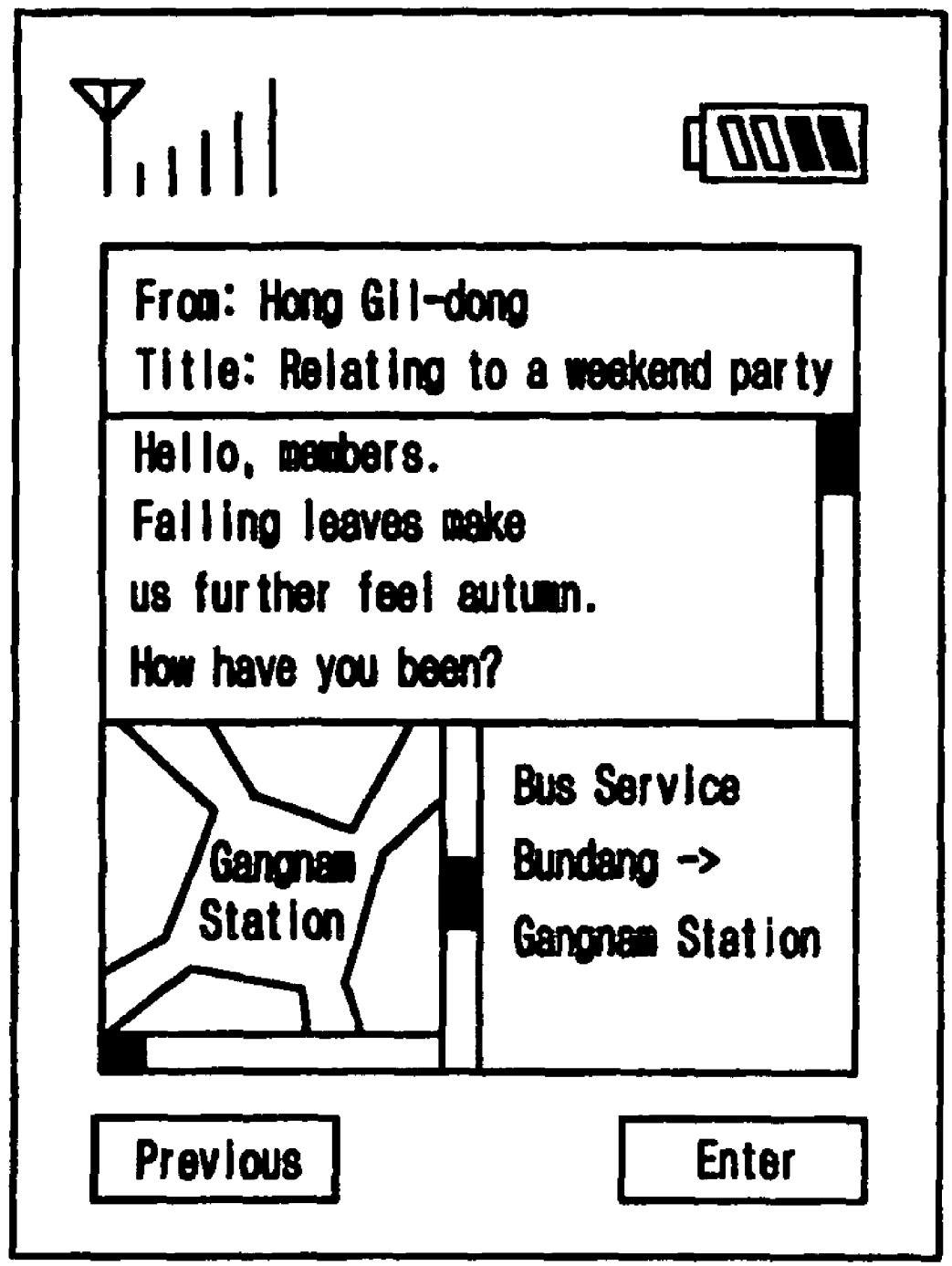
FIG. 3 is a diagram illustrating a screen of the mobile phone to which the present invention is applied when confirming a message.
Figure 4:
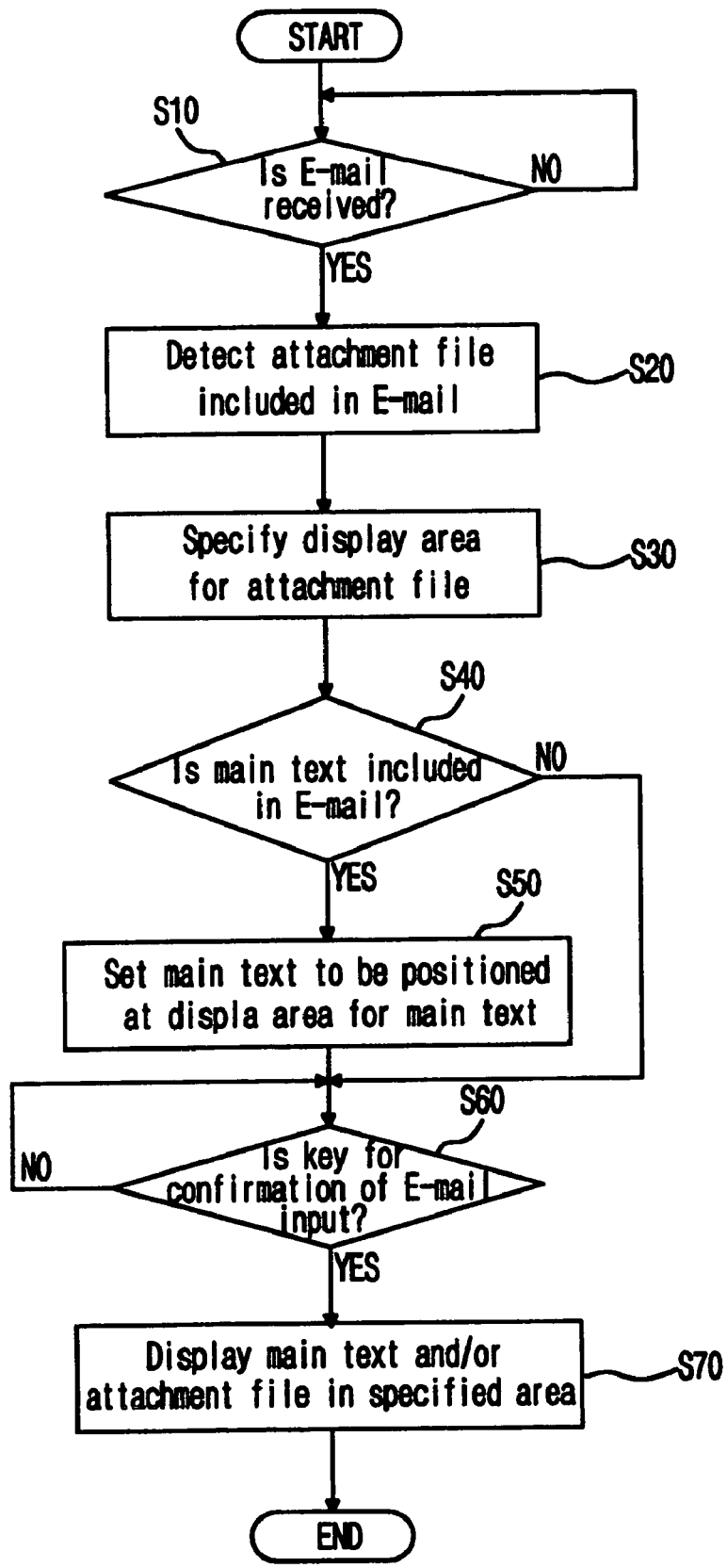
FIG. 4 is a flowchart showing steps included in the method of displaying a message in a mobile terminal according to one embodiment of the present invention.

FIG. 2 is a block diagram illustrating a structure of a mobile terminal to which the present invention may be applied, FIG. 3 is a diagram illustrating a screen of the mobile phone to which the present invention is applied when confirming a message, and FIG. 4 is a flowchart illustrating a procedure of displaying a message in the mobile phone according to the present invention.

The apparatus shown in FIG. 2 is preferably an apparatus for setting message data to be displayed in a screen (display unit) when confirming a message with a mobile phone. This apparatus preferably comprises a message display setting module 70, together with basic elements of a mobile terminal.

Referring to FIG. 2, the mobile terminal basically comprises a key input unit 10. A control unit 20, a radio frequency (RF) transmitting and receiving unit 30, a display unit 40, a memory 50, a sound processing unit 60, and an e-mail display setting module 70. The key input unit includes a plurality of numeral keys and functional keys, which output key data corresponding to the key pressed by a user. The control unit performs general operation controls of the mobile phone. The radio frequency (RF) transmitting and receiving unit carries out amplification, filtering, modulation, and demodulation of RF signals transmitted and received through an antenna. The memory stores data received through the RF transmitting and receiving unit 30 and key data input through the key input unit 10, and specifically stores display-area specifying data of a message input by a user. The sound processing unit carries out modulation and demodulation of sound signals input and output through a microphone and a speaker under control of control unit 20.

The mobile phone transmits and receives a message through a wireless communications network such as the Internet. That is, when a user establishes an account (message address) in the mobile terminal, the user confirms messages by inputting an identifier and a password of the account.

When a message arrives at the account established in the mobile terminal and a key for confirming the message is pressed, the control unit 20 outputs a control signal for displaying the received message in the display unit 40. The message display setting module 70 then converts the format of the message before displaying the message in the display unit after the message is received.

The message display setting module 70 sets (converts) display formats of the main text and the attached file based on a language such as but not limited to a synchronized multimedia integration language (SMIL). SMIL is an integrated language which can temporally and spatially reproduce various multimedia data such as text, image, audio, video, etc.

When a message is received, the message display setting module 70 specifies the display areas for the main text and attached files, or sets a reproduction time for an audio file when the audio file is attached, and then converts the message to an SMIL file. The control unit then displays the received message in the display by driving the SMIL files in response to activation of a key indicating confirmation of the message by the user.

A message can include main text and at least one attached file. Confirmation of a message includes a main text and a plurality of attached files which will be now described.

When a message is received, message display setting module 70 specifies the attached file to be executed and displayed in the specified display areas at the display unit simultaneously with the main text.

The message display setting module 70, first, detects display-specifying data of the message stored in the memory 50 and then allots a display area in accordance with the display-specifying data. For example, display unit 40 may be divided into two or more areas. The main text of the message may be displayed in the first area and the attached files may be displayed in the second area. Alternatively, the attached files may be displayed in the first area and the main text of the message may be displayed in the second area.

The areas may also be divided up and down or left and right. The user may input, in advance, the display-specifying data for dividing the display area up and down, or left and right, for the purpose of convenient confirmation of the message. The display-specifying data directly input by the user are stored in the memory.

When a message is received, display setting module 70 detects the display-specifying data from the memory and allots the display areas of the main text and/or the attached file of the message in accordance with the display-specifying data input in advance by the user.

Input of the display-specifying data may be carried out using a predetermined input menu, and then inputting set values for prepared items by manipulating of the key input unit relative to the menu.

In the aforementioned example, when two or more attached files are included in the message, the number of attached files (corresponding to the number of areas allotted to display the attached files) are displayed and the other attached files are sequentially and rotationally displayed.

For example, when the message includes four attached files and the number of areas which are allot to display the attached files is two, two attached files are first displayed and the other two attached files are then sequentially displayed.

When the user first confirms two displayed attached files and then press a predetermined key, the other attached files are sequentially displayed.

In the mobile phone shown in FIG. 3, the main text of the message is displayed in an area indicated by reference numeral 10 and the attached files are displayed in areas indicated by reference numerals 20 and 30. That is, when two or less attached files are included in the message, all the attached files are simultaneously displayed in the display unit.

When two attached files are displayed and when the message includes three or more attached files, two attached files may be displayed in the areas indicated by reference numerals 20 and 30 and the other attached files may be sequentially and rotationally displayed in the area indicated by 20 or 30 automatically or in response to press of a predetermined key by the user.

In the areas which are set to display the attached files, image file may be displayed in the area indicated by 20 and a text file may be displayed in the area indicated by 30.

The other attached file is displayed in the area indicated by 20 or 30 in the following way. That is, the next attached file may be displayed in the corresponding area with a predetermined cycle, or the next attached file may be displayed in the corresponding area in response to press of a key or icon indicating display of the next attached file by the user. The cycle when the next attached file is rotationally displayed may be set on the basis of the display-specifying data input by the user.

The attached file may include text files, image files, moving picture files, sound files, etc., and when two or more image files are included as the attached files it can be set to display the respective image files in the same size.

When a sound file is included as the attached file, the sound file may be executed at the point in time when a key indicating confirmation of the message is pressed. Alternatively, when the execution time of the sound file is set after the message is confirmed in accordance with the display-specifying data, the sound file may be executed in the set execution time after press of the key indicating confirmation of the message.

FIG. 3 illustrates an example of the areas in which the main text and the attached files of the message may be displayed in the display unit. It can be seen from this figure that the areas can be changed.

Message display setting module 70 can convert the message in a synchronized multimedia integration language (SMIL) in order to specify the display areas for the main text and the attached files of the received message. And, the control unit may display the received message in the display unit as shown in FIG. 3, by driving the files converted in the SMIL in response to press of the key indicating the confirmation of the message by the user.

FIG. 4 shows a message display process in a mobile terminal according to the present invention.

First, a user account is established to transmit and receive messages in a mobile phone, and display-specifying data are input.

When a message arrives at a message address of the account (S10), the message display setting module detects attached files included in the message (S20), and also detects the number of display areas allotted by display-specifying data stored in the memory 50.

The message display setting module converts the message into SMIL file, such that if a number of attached files exceeds that of displaying area to display the attached file, the number of attached files which can be displayed in the display areas in the display unit is displayed. Then, the other attached files may be sequentially and rotationally displayed.

When an attached file is displayed in a corresponding area, scroll bars may also be displayed as shown in FIG. 3, and the user can confirm the attached files by moving the scroll bars up and down or left and right.

The message display setting module also determines whether a main text exists, so as to specify the area in which the main text of the message is to be displayed in the display unit (S40).

When the main text of a text type exists, the display area for the main text is additionally specified (S50). The main text may be displayed in the area of the display unit set to display the main text.

As described above, when the key indicating the confirmation of the received message is pressed (S60) after the display areas for the main text and the attached files of the message, the main text and the attached files are displayed in the corresponding areas of the display unit 40 (S70). The main text and the attached files of the message can therefore be simultaneously displayed in a screen of the display unit thereby making it possible to more easily confirm the message.

Also, when a message is confirmed using a mobile phone according to the present invention, the main text and attached files of the message are displayed in the specified areas of the display unit, so that it is possible to confirm the message at first glance.

In addition, when the main text of the message is related to the attached files, it is possible to more easily confirm the message.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for displaying information in a mobile terminal, comprising:
    receiving a message that includes text information and a plurality of unrelated attached image files; and
    simultaneously displaying text in a first area and at least one of the attached image files in a second area of a screen of the mobile terminal, a location of the second area determined based on a predetermined setting, said displaying including:
    displaying the attached files sequentially in the second area, and wherein:
    the attached files are displayed, one-by-one, in the second area in response to signals generated by activation of a first key of the mobile terminal,
    the first and second areas displaying the text and the at least one attached file are scrolled on the screen while the text and the at least one attached file are simultaneously displayed in the first and second areas respectively, and
    an indicator is displayed to indicate that one or more of the attached files are available for viewing in the second area in addition to the at least one attached file currently displayed in the second area.

2. The method of claim 1, wherein the attached image files are displayed sequentially and rotationally on the screen of the mobile terminal.

3. The method of claim 1, wherein the first key controls sequential display of the images files in the second area independent from link information included with the attached image files or in any portion of the message.

4. The method of claim 1, wherein the attached image files are sequentially displayed in the second area according to a predetermined cycle.

5. The method of claim 4, wherein information for setting the predetermined cycle is stored in the mobile terminal before the message is received.

6. The method of claim 4, wherein the predetermined cycle is adjustable.

7. The method of claim 6, wherein the predetermined cycle is adjustable based on control information stored in the mobile terminal.

8. The method of claim 1, wherein the text is displayed in the first area and the attached image files are sequentially displayed in the second area in a non-overlapping relationship relative to information including the text in the first area.

9. The method of claim 8, wherein said displaying includes:
    displaying the text and the attached image files in the first and second areas, respectively, based on display-specifying data corresponding to the predetermined setting.

10. The method of claim 9, wherein the display-specifying data is input by a user using an input menu.

11. The method of claim 8, further comprising:
    changing areas of the screen where the text and attached image files are to be displayed.

12. The method of claim 1, wherein said displaying includes:
    simultaneously displaying images associated with at least two attached files on the screen of the mobile terminal with the text displayed in the first area.

13. The method of claim 1, wherein information with regard to the message is displayed with the text and the attached image files.

14. The method of claim 13, wherein the information includes at least one of a calling party or a title.

15. The method of claim 1, wherein the attached image files are displayed on the screen of the mobile terminal independent from link information included with the attached image files or the message.

16. The method of claim 1, wherein the text and the at least one attached file in the first and second areas are independently scrolled on the screen in response to a signal from one or more of the first key or a second key of the mobile terminal.

17. A mobile terminal, comprising:
a screen;
a receiver to receive a message that includes text information and a plurality of unrelated attached image files; and
a controller to control display of text in a first area and display of the attached image files sequentially in a second area on the screen, wherein the controller controls the display of each of the attached image files on the screen independent from link information in any of the image files or in the message,
wherein the text is displayed in the first area simultaneously with at least one of the attached image files in the second area,
wherein the attached image files are displayed in the second area one-by-one, in response to signals generated by activation of a first key of the mobile terminal, and
wherein an indicator is displayed to indicate that one or more of the attached files are available for viewing in the second area in addition to at least one attached file currently displayed in the second area.

18. The mobile terminal of claim 17, wherein the attached image files are displayed sequentially and rotationally in the second area on the screen of the mobile terminal.

19. The mobile terminal of claim 17, further comprising:
a memory to store control information indicative of a predetermined cycle for sequentially displaying the attached image files, the predetermined cycle set by information stored in the mobile terminal before the message is received.

20. The mobile terminal of claim 19, wherein the information for the predetermined cycle is set by a user of the mobile terminal.

21. The mobile terminal of claim 19, wherein the predetermined cycle is adjustable.

22. The mobile terminal of claim 21, wherein the predetermined cycle is adjustable based on control information stored in the mobile terminal.

23. The mobile terminal of claim 17, wherein the controller controls display of the text and the attached image files in the first and second areas, respectively, based on display-specifying data.

24. The mobile terminal of claim 23, wherein the display-specifying data is input by a user using an input menu.

25. The mobile terminal of claim 17, wherein the controller changes areas of the screen where the text and attached files are to be displayed.

26. The mobile terminal of claim 17, wherein the controller controls simultaneous display of at least two of the attached image files on the screen of the mobile terminal.

27. The mobile terminal of claim 26, wherein the the at least two attached image files are displayed in different areas of the screen.

28. The mobile terminal of claim 17, wherein the controller sequentially scrolls the attached files in the second area on the screen.

29. The mobile terminal of claim 17, wherein the controller controls information with regard to the message to be displayed with the text and the attached image files.

30. The mobile terminal of claim 29, wherein the information includes at least one of a calling party or a title.

31. The mobile terminal of claim 17, wherein the controller independently scrolls the text in the first area and at least one of the image files displayed in the second area based on activation of one or more keys of the mobile terminal.

* * * * *